United States Patent
Avina Flores et al.

(10) Patent No.: US 10,576,813 B2
(45) Date of Patent: Mar. 3, 2020

(54) MOUNTING BRACKET FOR A VEHICLE COMPONENT AND METHOD OF FORMING

(71) Applicant: Ford Global Technologies, LLC, Dearborn, MI (US)

(72) Inventors: Kristian Ulyses Avina Flores, Mexico City (MX); Abdelkrim Zouani, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 15/676,123

(22) Filed: Aug. 14, 2017

(65) Prior Publication Data

US 2019/0047395 A1 Feb. 14, 2019

(51) Int. Cl.
| | | |
|---|---|---|
| *B60K 5/12* | (2006.01) | |
| *F16F 7/10* | (2006.01) | |
| *F16F 15/02* | (2006.01) | |
| *B60K 17/00* | (2006.01) | |
| *B22D 23/00* | (2006.01) | |
| *B22D 25/02* | (2006.01) | |

(Continued)

(52) U.S. Cl.
CPC ............ *B60K 5/1233* (2013.01); *B22D 23/00* (2013.01); *B22D 25/02* (2013.01); *F16F 1/3849* (2013.01); *F16F 7/10* (2013.01); *F16F 7/116* (2013.01); *F16F 15/02* (2013.01); *B60K 5/1208* (2013.01); *B60K 17/00* (2013.01)

(58) Field of Classification Search
CPC ...... B60K 5/12; B60K 5/1208; B60K 5/1225; B60K 5/1241
See application file for complete search history.

(56) References Cited

U.S. PATENT DOCUMENTS

| | | | | |
|---|---|---|---|---|
| 4,456,213 A | * | 6/1984 | Fukushima | ............. F16F 7/108 248/559 |
| 5,687,948 A | * | 11/1997 | Whiteford | .............. B64D 27/26 248/557 |
| 5,927,678 A | | 7/1999 | Parr | |

(Continued)

FOREIGN PATENT DOCUMENTS

| | | |
|---|---|---|
| DE | 19848799 A1 | 4/2000 |
| EP | 0331951 A2 | 9/1989 |

(Continued)

*Primary Examiner* — James A Shriver, II
*Assistant Examiner* — Vaughn Coolman
(74) *Attorney, Agent, or Firm* — Brooks Kushman P.C.; Geoffrey Brumbaugh

(57) ABSTRACT

A mounting assembly and a method of forming the assembly is provided. The assembly has a first bracket and second bracket, and a bushing therebetween. The first bracket is formed by a member having a main portion defining a first face configured to mate with a vehicle component and a second face, and has a secondary portion extending outwardly from the main portion via a necked region. The second bracket is configured to mate with a vehicle chassis. An active side bracket for a vehicle component mount is provided by a member having a main portion defining a first mounting face with a tab extending outwardly from the main portion to define a second mounting face. A necked region extends outwardly from the tab to a secondary portion, and the tab, the necked region, and the secondary portion are co-planar in an unexcited state.

17 Claims, 5 Drawing Sheets

(51) Int. Cl.
*F16F 1/38* (2006.01)
*F16F 7/116* (2006.01)

(56) References Cited

U.S. PATENT DOCUMENTS

| | | | |
|---|---|---|---|
| 6,070,849 A | 6/2000 | Larmande et al. | |
| 6,374,939 B1* | 4/2002 | Hohnstadt | B60K 5/1208 180/299 |
| 7,810,466 B2* | 10/2010 | Preimesberger | F02B 67/10 123/184.31 |
| 9,739,337 B2* | 8/2017 | Hayashi | F16F 15/08 |
| 9,828,744 B2* | 11/2017 | Sumiyoshi | B60K 5/02 |
| 9,931,923 B2* | 4/2018 | Oki | B60K 5/1208 |
| 2008/0223329 A1* | 9/2008 | Preimesberger | F02B 67/10 123/195 A |
| 2013/0328254 A1* | 12/2013 | Kojima | B60K 5/1241 267/140.15 |
| 2015/0345583 A1* | 12/2015 | Ishikawa | F16F 3/0873 248/634 |
| 2016/0040747 A1* | 2/2016 | Hayashi | B60K 5/1208 267/141 |
| 2017/0335920 A1* | 11/2017 | Kanaya | B60K 5/1208 |
| 2017/0341500 A1* | 11/2017 | Oki | B60K 5/1208 |
| 2018/0009306 A1* | 1/2018 | Nakamaru | B60K 5/1208 |
| 2018/0030581 A1* | 2/2018 | Michiyama | C22F 1/04 |
| 2018/0044885 A1* | 2/2018 | Sumiyoshi | E02F 9/0866 |

FOREIGN PATENT DOCUMENTS

| | | |
|---|---|---|
| JP | H0893847 A | 4/1996 |
| KR | 101424700 B1 | 8/2014 |

* cited by examiner

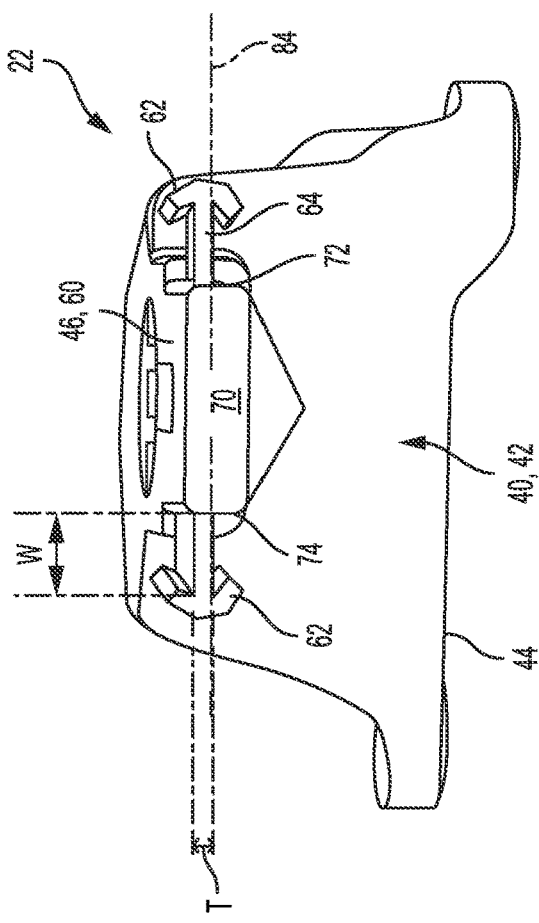
FIG. 4
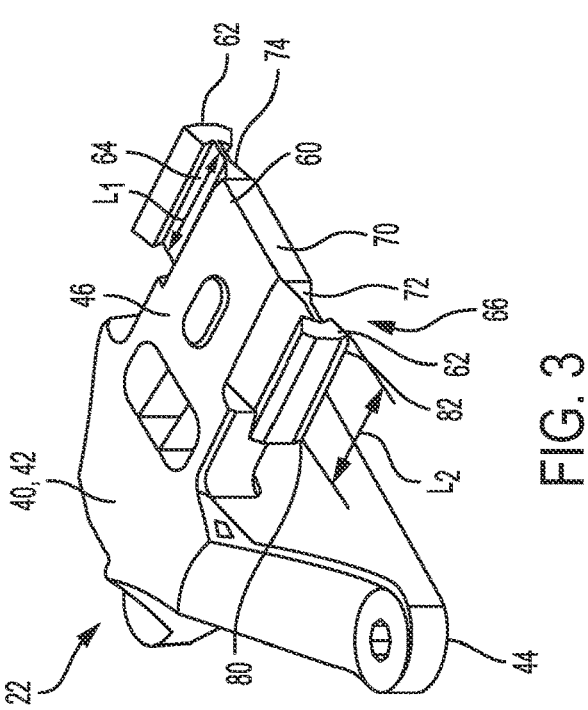
FIG. 3
FIG. 5

MOUNTING BRACKET FOR A VEHICLE COMPONENT AND METHOD OF FORMING

TECHNICAL FIELD

Various embodiments relate to a mounting bracket for a mounting assembly for a vehicle component such as an internal combustion engine or a transmission.

BACKGROUND

Vehicle components, such as an internal combustion engine or a transmission, are connected to the vehicle chassis via a mounting assembly or mount. As the component operates, vibrations from the component may result in displacement of the bracket attached to the component, due to compliance of the bracket. This may result in noise, vibration, and harshness (NVH) issues for the vehicle, including vibration of the vehicle steering wheel, seat tracks and floor pan. The bracket displacement may also contribute to structure-borne noise, which contributes to the sound pressure level in the passenger compartment, and may also affect shift quality, ride comfort and other NVH phenomena.

SUMMARY

In an embodiment, a mounting assembly is provided with a first bracket, a second bracket, and a bushing. The first bracket is formed by a member having a main portion defining a first face configured to mate with a vehicle component and a second face, and has a secondary portion extending outwardly from the main portion via a necked region. The second bracket defines a third face configured to mate with a vehicle chassis and a fourth face. The bushing extends between and mates with the second and fourth faces.

In another embodiment, a method of forming a vehicle component mounting assembly is provided. A mounting bracket is cast with a main portion and a secondary portion extending outwardly therefrom via a necked region. A first face and a second face are formed on the main portion of the mounting bracket. The first face is configured to mate with a vehicle component and the second face is configured to mate with a mount element.

In yet another embodiment, an active side bracket for a vehicle component mount is provided by a member having a main portion defining a first mounting face with a tab extending outwardly from the main portion to define a second mounting face. The member further defines a necked region extending outwardly from the tab to a secondary portion. The tab, the necked region, and the secondary portion are co-planar in an unexcited state.

BRIEF DESCRIPTION OF THE DRAWINGS

FIG. 3 illustrates a perspective view of a bracket for the mount assembly of FIG. 1 according to another embodiment;

FIG. 4 illustrates a side perspective view of the bracket of FIG. 3;

FIG. 5 illustrates a perspective view of a bracket for the mount assembly of FIG. 1 according to yet another embodiment;

DETAILED DESCRIPTION

As required, detailed embodiments of the present disclosure are provided herein; however, it is to be understood that the disclosed embodiments are merely examples of the disclosure and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
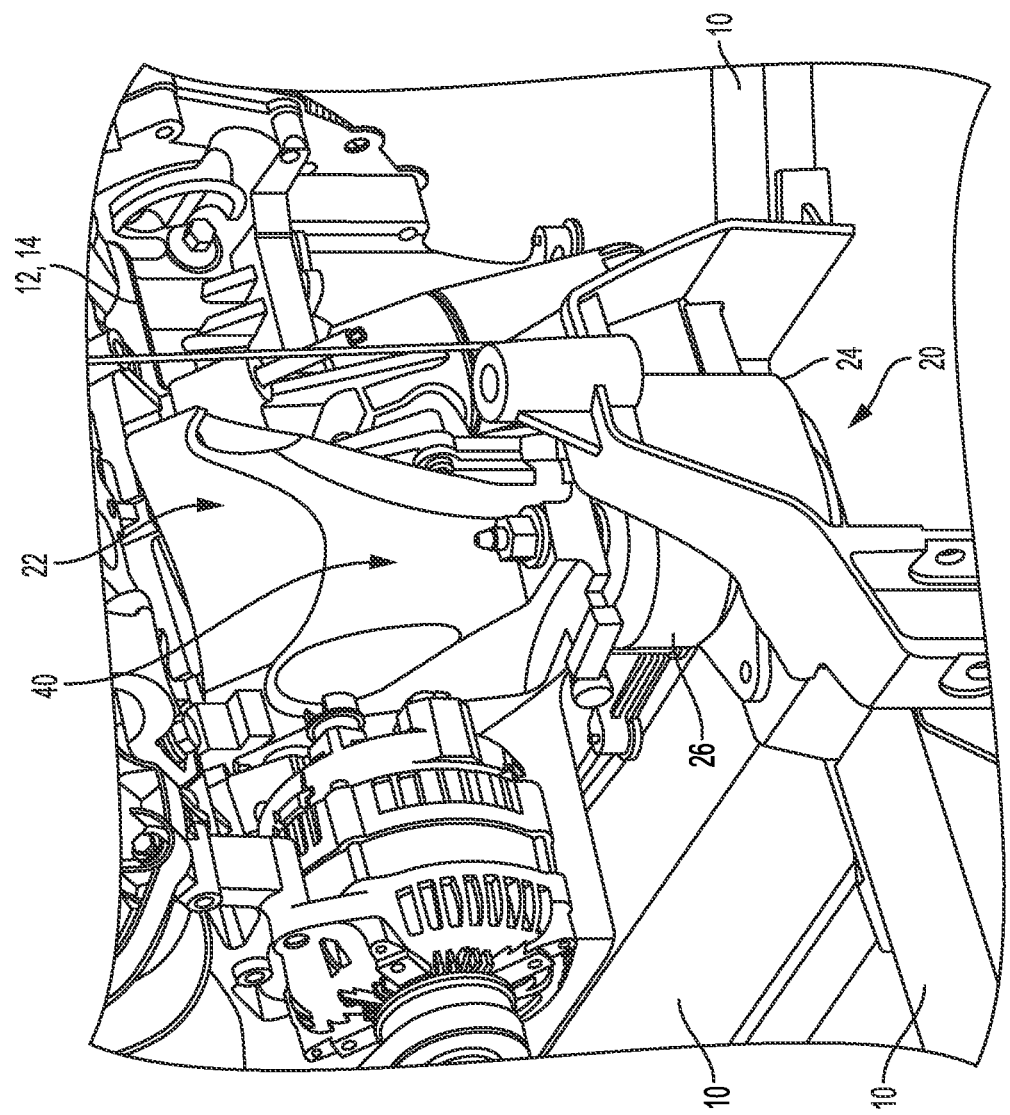
FIG. 1 illustrates a perspective view of a vehicle chassis and vehicle component attached via a mounting assembly according to an embodiment.

FIG. 1 illustrates a partial perspective view of a vehicle having a chassis 10 and a vehicle component 12. The vehicle chassis 10 may be provided by a unibody structure that forms a combined frame and body structure for the vehicle, by a frame structure such as a ladderframe, or by another structure as is known in the art. The chassis 10 may include subframes as well. The chassis 10 supports various components including the vehicle component 12, steering assemblies, drivelines, suspension systems, wheels, and the like. The vehicle component 12 may be an internal combustion engine or a transmission. FIG. 1 illustrates the vehicle component as an internal combustion engine 14. The chassis 10 also supports a passenger compartment or passenger cabin.

Figure 2:
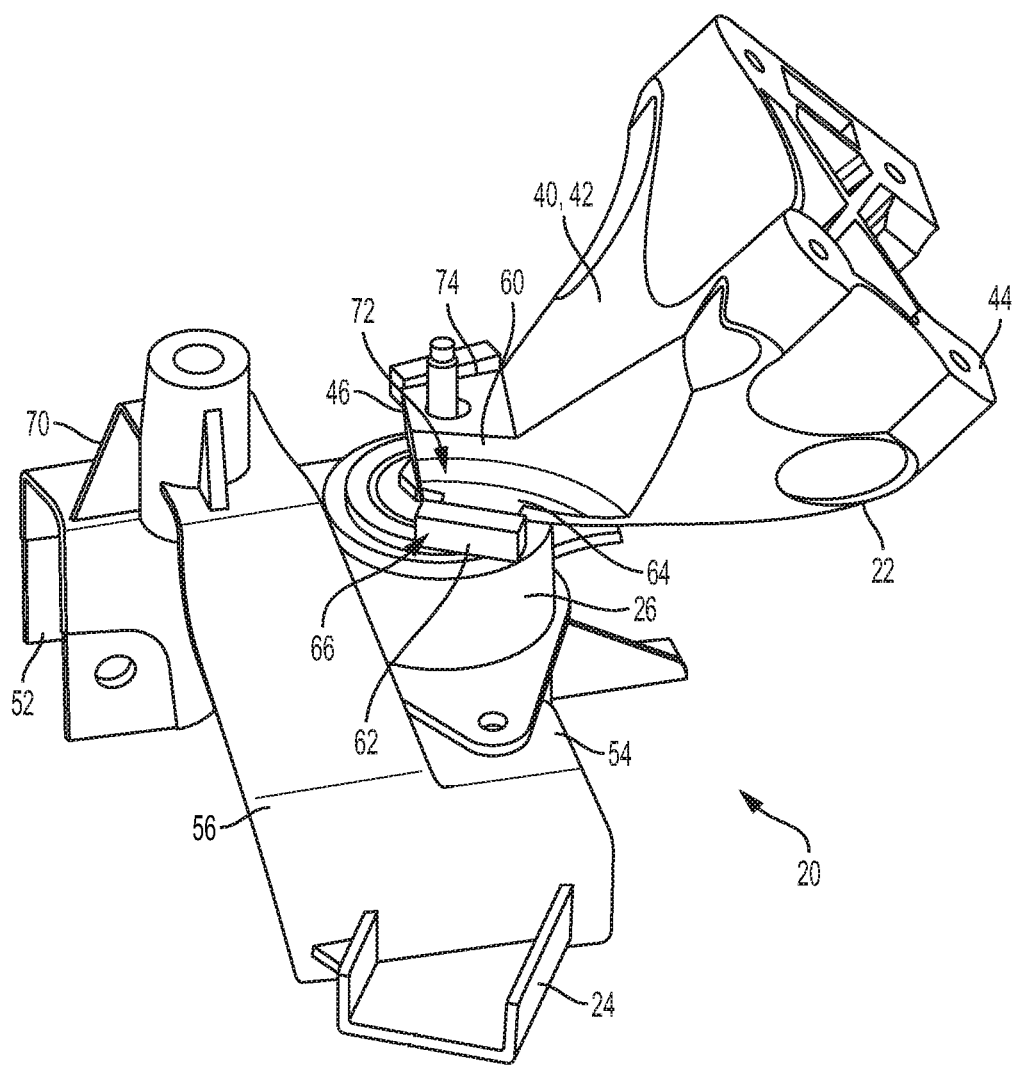
FIG. 2 illustrates a perspective view of the mount assembly of FIG. 1.

The vehicle components 12 are each connected to the chassis 10 by a series of mount assemblies. The mount assemblies act to couple the vehicle component 12 to the frame 10 to maintain the position of the component relative to the chassis during vehicle operation. As shown in FIG. 1, a mount assembly 20 is used to connect the vehicle component 12, or engine 14, to the chassis 10. Referring to FIGS. 1 and 2, the mount assembly 20 may include a first bracket 22, a second bracket 24, and a mount element 26 such as a bushing or isolator. The mount assembly 20 may be adapted as a front mount assembly, side mount assembly, bottom mount assembly, or otherwise configured to connect the vehicle component 12 to the chassis 10.

The first bracket 22 is connected to the vehicle component 12, and is also known as the active-side bracket as it directly receives vibrations from an operating component 12. The second bracket 24 is connected to the chassis 10. The mount element 26 is positioned between and connects the first bracket 22 to the second bracket 24.

During vehicle operation, the vehicle components are operated, e.g. the engine 14 and the transmission 16 are operated. As the component operates, vibration is transmitted to the bracket 22 connected thereto, as the bracket is on the active-side of the mount assembly. This vibration and motion may cause the bracket itself to be displaced or move due to compliance in the bracket, and the compliance or displacement of the bracket may be increased at certain frequencies. Often, the bracket displacement is large where the bracket connects to the mount element based on the structure of the bracket. The bracket 22 displacement is imparted to the mount element, and then to the other bracket and chassis. The present disclosure provides for a tuned mass damper that is integrally formed with the bracket and sized and located to counteract the displacement of the bracket, and therefore reduce NVH issues caused by bracket compliance.

During operation of the component 12, e.g. engine 14 or transmission, the bracket 22 attached thereto may flex, bend, vibrate, or otherwise be displaced. Displacements of these brackets 22, for example, due to excitation caused by transmitted vehicle component vibrations, may cause NVH issues. For example, displacements of the bracket 22 may be transmitted through the rest of the mount assembly 20 and into the chassis 10, and be further transmitted to other components of the vehicle, e.g. to cause vibrations at the steering wheel, seat tracks and floor pan. The displacements of the bracket 22 may also cause structure-borne noise, which may contribute to the sound pressure level in a passenger compartment. The bracket 22 displacements may also affect transmission shift quality, ride comfort and other NVH vehicle phenomena.

The dynamic compliance of the active-side mount bracket 22 affects the magnitude of the displacement of the mount assembly 20 and the forces onto the chassis 10. If the compliance of the bracket 22 is too high, the vibrations generated by the vehicle component 12 attached thereto, e.g. engine 14 or transmission, may be amplified. The dynamic compliance of the bracket 22 is the dynamic displacement of the bracket 22 under unit load excitation, and is dependent on: the mass distribution of the bracket, distributions of stiffness of the bracket, and the bracket attachment to the vehicle component. The dynamic compliance may have a peak compliance at a frequency that impacts vehicle NVH, and this frequency may be the resonant frequency of the bracket due to a balance between the weight and stiffness distributions of the bracket 22. Although brackets and mounting assemblies are designed to meet determined compliance levels and resonant frequencies, the design is often constrained by limited packaging space and other attributes such as impact resistance, manufacturability, weight, and cost. Due to these constraints, conventional mount brackets often do not meet the required compliance levels and target resonant frequencies, such that the overall vehicle NVH is impacted.

One embodiment of a mount assembly is shown in FIGS. 1 and 2. Another embodiment of a bracket for a mount assembly is shown in FIGS. 3 and 4. A further embodiment of a bracket for a mount assembly is shown in FIG. 5. Elements of the mount assemblies and brackets that are the same or similar are given the same reference numbers.

Referring to FIGS. 1-5, the mount assembly 20 according to the present disclosure has a bracket 22 that is provided with a damper, or tuned mass damper that is integrally formed with the bracket 22, such that the bracket 22 is self-damping.

The first bracket 22 is formed by a member 40 having a main portion 42 defining a first face 44 and a second face 46. The first face 44 is configured to mate with a corresponding mounting face on the vehicle component 12. The second face 46 is configured to mate with a face of the mount element 26. As shown, the faces 44, 46 may be spaced apart and angled relative to one another, although other orientations are also contemplated.

The second bracket 24 is formed by a member 50 defining a third face 52 and a fourth face 54. The third face 52 is configured to mate with a corresponding face or region of the vehicle chassis 10. In other examples, the third face 52 may be provided by one or more mounting faces configured to mate with various faces or parts of the chassis 10. The fourth face 54 configured to mate with the other end of the mount element 26.

The mount element 26 extends between and mates with the second face 46 of the first bracket 22 and the fourth face 54 of the second bracket 24. The mount element 26 may be provided by a bushing or isolator. According to one example, the mount element is provided by a hydraulic mount incorporating a fluid. According to another example, the mount element 26 is be formed from or includes a resilient material. For example, the bushing 26 may be formed from an annular cylinder of flexible material positioned between an outer tube and an inner tube, with the tubes being formed from another material such as metal. In further examples, the mount element 26 may be incorporated into one of the brackets, such as the second bracket 24.

Referring back to the first bracket 22, the main portion 42 defines a tab region 60. The member 40 also has and defines at least one secondary portion 62. Each secondary portion 62 extends outwardly from the main portion 42 via a necked region 64. In the examples shown, each secondary portion 62 extends outwardly from the tab region 60 of the main portion 42.

This secondary portion 62 forms the mass of the tuned mass damper 66 for the bracket 22, and the necked region 64 acts as a spring. The secondary portion 62 is sized with a predetermined mass. The associated necked region 64 is sized with a predetermined cross-sectional area and a predetermined length (L1) to provide a predetermined stiffness or spring coefficient for the necked region. In one example, the predetermined cross-sectional area is provided by a predetermined thickness (T) and width (W) to provide the cross-sectional area of the necked region 64. In the example shown, the cross-sectional area of the necked region 64 is provided as a rectangular shape; however, other shapes are also contemplated for the necked region. The secondary portion 62 and associated necked region 64 collectively provide a tuned mass damper 66 for the first bracket 22 that is integrally formed with the first bracket 22. The tuned mass damper 66 is configured to damp an amplitude of a resonant frequency of the first bracket 22. In the examples shown, the tuned mass damper 66 extends from a region of the first bracket 22 with a high dynamic compliance, e.g. the tab region 60.

The tuned mass damper 66 is integrally formed with the bracket 22, and includes the necked region 64 and the secondary portion 62. The secondary portion 62 provides a concentrated mass element. The necked region 64 provides a thin cross-section or cross-sectional area that connects the concentrated mass element to the tab 60 of the bracket. The effective stiffness (k) of the thin section 64 is a function of its length (L1) and cross-sectional area dimensions, e.g. T, W. The effective stiffness and the effective weight provided by the concentrated mass of the secondary portion 62 may be tuned to the resonant frequency of the bracket 22 to provide damping that reduces the amplitude of the bracket compliance, thereby reducing NVH.

The tuned mass damper 66 acts as a mass and spring system attached to the body of the bracket 22, at or near a location of maximum displacement of the bracket 22, e.g. the tab region 60 in the examples shown. The necked region 64 acts as a spring with a specific stiffness (k) and the secondary portion 62 acts as a mass (m) in order to damp the dynamic response of the bracket 22. In various embodiments, the bracket 22 may be provided with one, two, three or more tuned mass dampers 66, with the location and tuning, e.g. mass and stiffness, based on the design of the bracket and the associated resonant frequency.

The bracket 22 may be provided with two tuned mass dampers as shown in FIGS. 1-4. In other examples, the bracket may be provided with only one tuned mass damper as shown in FIG. 5, or with three or more tuned mass dampers. For example, if the tab region 60 and the bracket 22 has a torsional mode (rotation about a longitudinal axis of the tab 60), the bracket 22 may be provided with two tuned mass dampers 66 as shown in FIGS. 3-4, with each tuned mass damper 66 located at or near the bracket mode shape anti-node. In another example, if the tab region 60 and the bracket 22 has a bending mode (rotation about a transverse axis of the tab 60), the bracket 22 may be provided with one tuned mass damper 66 as shown in FIG. 5, with the tuned mass damper 66 located at or near the bracket mode shape anti-node. With reference to FIGS. 1-2, the tuned mass dampers are positioned to counteract the amplitude of vibration due to a twisting or torsional mode of the tab region 60 around a longitudinal axis of the tab 60.

The tab region 60 may provide the second face 46 of the first bracket 22, and may be provided as an extension of the main portion 42 such that it has a higher compliance than the remainder of the main portion 42 based on having less structure associated with it. As shown, the tab region 60 has an end surface 70 connecting first and second side surfaces 72, 74 about the second face 46. The end surface 70 and first and second side surfaces 72 surround the second face 46 to provide a perimeter of the tab region 60 and the second face 46. The first and second side surfaces 72, 74 and the end surface 70 may be perpendicular or otherwise angled relative to the second face 46. The first and second side surfaces 72, 74 and the end surface 70 may all be angled relative to one another, as shown in FIGS. 1-2. In other examples, as shown in FIGS. 3-5, the first and second side surfaces 72, 74 may be parallel to one another.

For example, as shown in FIGS. 1-4, the bracket 22 has two tuned mass dampers 66 extending outwardly from the tab region 60. The necked region 64 extends outwardly from tab region 60 to the secondary portion 62 such that the secondary portion 62 is spaced apart from the tab region 60 and the main portion 42.

The tuned mass damper 66 may extend outwardly from one of the first side surface 72, the second side surface 74, and the end surface 70. For a bracket 22 with two tuned mass dampers 66, the necked region 64 of the first tuned mass damper 66 may extend outwardly from the first side surface 72 to the associated secondary portion 62, and the necked region 64 of the second tuned mass damper 66 may extend outwardly from the second side surface 74 to the associated secondary portion 62. In this manner, the first and second tuned mass dampers 66 are symmetrically arranged on the tab region 60. In other examples, the first and second tuned mass dampers 66 may be arranged on a side surface 72, 74 and an end surface 70, respectively, for various reasons such as packaging constraints, and the like.

In other examples, the bracket 22 may be provided with only one tuned mass damper as shown in FIG. 5, with the necked region 64 extending outwardly from the end surface 70 to the associated secondary portion 62. In other examples, the single tuned mass damper 66 may be provided on one of the side surfaces 72, 74 for various reasons such as packaging constraints, and the like.

In further examples, the bracket 22 may be provided with three tuned mass dampers 66, with the necked region 64 of each extending outwardly from the first and second side surfaces 72, 74 and the end surface 70, respectively.

Referring to the examples shown in FIGS. 1-5, each of the tuned mass dampers 66 has a secondary portion 62 that extends longitudinally from a first end 80 to a second end 82 of the secondary portion 62. The necked region 64 similarly extends longitudinally along the secondary portion 62 from the first end 80 to the second end 82 such that a length (L1) of the necked region 64 is similar or the same as the length (L2) of the secondary portion 62. In other examples, the secondary portion 62 may have a length (L2) that is different than or greater than the length (L1) of the necked region 64.

The necked region 64 of each of the tuned mass dampers 66 may be co-planar with a plane 84 extending through the tab region 60 when the bracket 22 is unexcited, under a static condition or at rest, and the necked region 64 may extend parallel with the second face 46. The plane 84 therefore provides a midplane or neutral plane for the tuned mass dampers 66 such that displacement and compliance of the tab region 60 of the bracket 22 causes the secondary portion 62 to oscillate relative to the midplane 84 to damp displacement and vibration. In other examples, the necked region 64 and/or the secondary portion 62 of each of the tuned mass dampers 66 may be angled or offset relative to the plane 84 extending through the tab region 60 when the bracket 22 is unexcited.

Therefore, in various embodiments, the first bracket 22 is formed by a member 40 having a main portion 42. The main portion 42 defines a first mounting face 44 for connection with the vehicle component, and has a tab 60 extending outwardly from the main portion. The tab 60 defines a second mounting face 46 for connection with other components of the mounting assembly. A necked region 64 extends outwardly from the tab 60 to a secondary portion 62 to form a tuned mass damper 66 for the bracket, with the tab, the necked region, and the secondary portion being co-planar in an unexcited state of the bracket in plane 84. The first bracket 22 may also have another necked region 64 extending outwardly from the tab 60 to another secondary portion 62 to form another tuned mass damper 66 for the bracket, with the tab, the another necked region, and the another secondary portion being co-planar in an unexcited state in plane 84.

In the examples shown in FIGS. 1-4, the first tuned mass damper 66 has the necked region extending outwardly from the first side surface 72 such that the secondary portion extends alongside the first side surface. The second tuned mass damper 66 has the necked region extending outwardly from the second side surface 74 such that the secondary portion extends alongside the second side surface. As such, the tab region, the secondary portion of the first mass damper, and secondary portion of the second mass damper extend longitudinally in a plane 84 when the bracket is unexcited or at rest.

The necked region 64 is thinner than the tab region 60 or the associated secondary portion 62. As shown, the tab region has a first cross-sectional area, the secondary portion has a second cross-sectional area, and the necked region has a third cross-sectional area, with the third area being less than the first and second areas.

The secondary portion 62 may have various shapes to control the mass distribution of the secondary portion. The secondary portion 62 may be symmetric about the necked region 64, and may be symmetric about the plane 84 defined when the tuned mass damper 66 is in an unexcited state.

In the examples shown, the secondary portions 62 of each of the first and second tuned mass dampers 66 have the same mass as one another, and additionally have the same shape and size, such that the mass distribution in each of the tuned mass dampers 66 is the same. Similarly, the necked regions 64 of each of the first and second tuned mass dampers have the same shape and size, such that the compliance and spring coefficient for each of the tuned mass dampers is the same.

In other examples, the bracket 22 may have a first and second tuned mass damper 66 that are different than one another to address different resonant frequencies. In further examples, with three tuned mass dampers for a bracket 22, a pair of the dampers 66 may have identical properties and be arranged symmetrically, e.g. on the side surfaces 72, 74, while the tuned mass damper 66 on the end surface 70 may be different to address different resonant frequencies or modes of the bracket.

In other examples, the bracket 24 may contribute to NVH issues based on displacement and dynamic compliance of the bracket 24, as described above. As such, the bracket 24 may additionally be provided with a tuned mass damper 66 as described above, or may be provided with a tuned mass damper 66 instead of the first bracket 22, for example, based on packaging limitations, etc. For example, the second bracket 24 is formed by the second member 50 that has a second main portion defining the third face 52 and the fourth face 54. The second main portion may be provided with a secondary portion extending outwardly from the second main portion via another necked region, as described above with respect to the dampers 66 of the first bracket 22.

Figure 6:
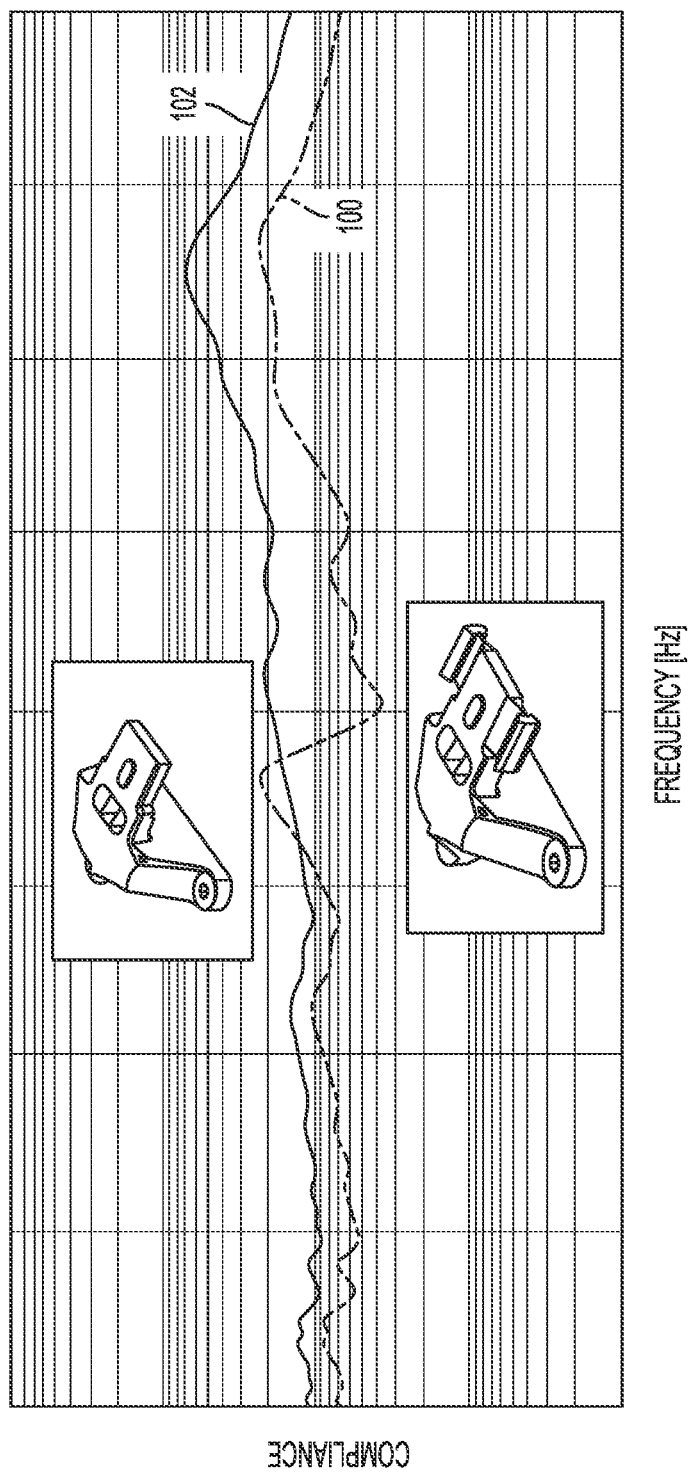
FIG. 6 is a graph providing compliance of the bracket versus frequency for the bracket of FIG. 3 in comparison with a conventional bracket.

FIG. 6 illustrates a graph of compliance of a bracket versus an input excitation frequency based on modelling results. The compliance associated with the bracket according to FIGS. 3-4 is illustrated as line 100. The compliance associated with a conventional bracket without integral tuned mass dampers is illustrated as line 102. For comparison purposes, the conventional bracket was modeled with a similar geometry as the main portion of the bracket of FIGS. 3-4 and without tuned mass dampers 66. FIG. 6 illustrates the NVH benefits of a self-damped bracket such as bracket 22. The compliance of the bracket 22 according to the present disclosure is up to thirty percent lower than the convention bracket, as shown by the differences between lines 100 and 102.

Figure 7:
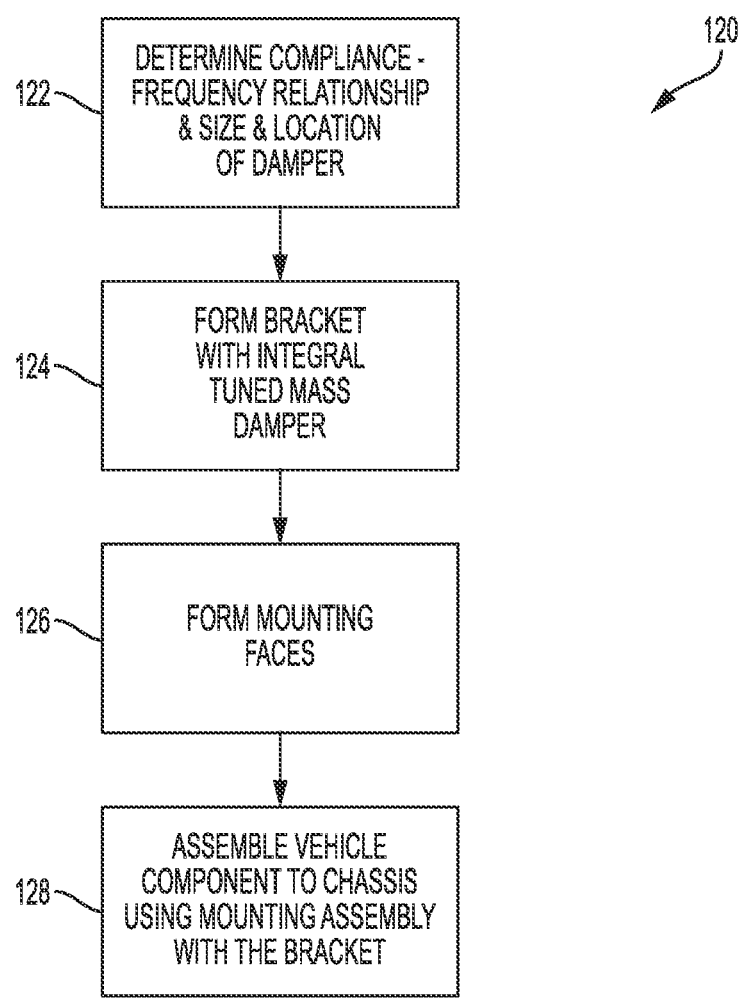
FIG. 7 illustrates a method of forming a mount assembly according to an embodiment.

FIG. 7 illustrates a method 120 of forming a vehicle component mounting assembly such as the mounting assemblies described above. The method may have a greater or fewer number of steps than shown, and the steps may be rearranged to be performed in another order.

At step 122, the compliance and frequency relationship for a bracket 22 is determined. For example, the compliance and frequency relationship for a bracket 22 is predicted through analytical simulation. The size, location, and number of the tuned mass dampers may then be determined and optimized for bracket 22. Additional factors, such as packaging constraints, may also be considered.

At step 124 a mounting bracket 22 is formed with a main portion and a secondary portion extending outwardly therefrom via a necked region to provide a tuned mass damper 66 for the bracket. The mounting bracket 22 may be formed using a casting process, such as die casting, sand casting, or the like, and may be formed from a metal or metal alloy, such as aluminum or an aluminum alloy. The bracket 22 may additionally be formed or cast with another secondary portion extending outwardly from the main portion via another necked region to provide another tuned mass damper 66 for the bracket. Each of the secondary portions are cast to have a predetermined mass with the associated necked region having a predetermined size and shape, e.g. thickness, width, and length. The resulting tuned mass damper 66 of the bracket is therefore configured to damp an amplitude of a resonant frequency of the bracket.

At step 126, a first face 44 and a second face 46 are formed on the main portion of the mounting bracket 22. The first face is configured to mate with a vehicle component and the second face is configured to mate with a mount element such as an isolator or bushing. The faces may be at least partially formed during the casting process at step 124, for example, in a near net shape casting process. Additionally or alternatively, the faces may be formed using a machining process, such as milling. The mounting faces may be further machined to provide apertures and/or threaded holes for use in connecting the bracket.

At step 128, the mounting bracket is provided with the rest of the mounting assembly, and is used to connect the vehicle component to the chassis during vehicle assembly.

Various embodiments according to the present disclosure have associated, non-limiting advantages. For example, a tuned mass damper is integrated into the body of the bracket in order to damp the amplitude of the bracket compliance at the resonant frequency. The geometry of the necked region or thin section may be optimized to achieve the desired effective stiffness of the spring element of the tuned mass damper. The effective weight, shape and center of gravity of the secondary portion or mass element may be optimized to achieve the desired effective mass of the tuned mass damper. For different brackets and various applications of the brackets, the number and location of the tuned mass dampers of the bracket may be determined and optimized. As such, the tuned mass damper(s) act to reduce the compliance of the bracket on the active-side of the bracket, and therefore reduce and improve NVH of the vehicle. By integrally forming the tuned mass damper with the bracket, it is easier to manufacture and assembly the bracket assembly, and provides for reduced costs compared to other damper systems such as shot damper, absorber dampers, or tuned mass dampers later connected to the bracket. Additionally, and importantly, the integrally formed tuned mass damper is less sensitive to temperature changes than a separate tuned mass damper system that is mechanically fastened or otherwise connected to a conventional bracket. The integrally formed tuned mass damper also does not introduce at least another degree of freedom as would be provided with a separate tuned mass damper system that is mechanically fastened or otherwise connected to a conventional bracket. A separate connected tuned mass damper may reduce the effectiveness of the damping provided based on the additional degree of freedom provided by the connection, and may additionally introduce new peak frequencies on either side of the resonant frequency it is designed to counteract.

While various embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A mounting assembly comprising:
a first bracket formed by a member having a main portion defining a first face configured to contact a vehicle component and a second face, with a secondary portion extending outwardly from the main portion via a necked region, wherein the main portion forms a tab region defining the second face, the tab region defining an end surface connecting first and second side surfaces about the second face, and wherein the necked region extends outwardly from the tab region to the secondary portion;

a second bracket defining a third face configured to contact a vehicle chassis and a fourth face; and an isolator mount element extending between and contacting the second and fourth faces.

2. The mounting assembly of claim 1 wherein the member of the first bracket has another secondary portion connected to the main portion by another necked region.

3. The mounting assembly of claim 2 wherein the mass of the secondary portion is equivalent to the mass of the another secondary portion.

4. The mounting assembly of claim 3 wherein the vehicle component is one of an internal combustion engine and a transmission.

5. The mounting assembly of claim 1 wherein the necked region extends outwardly from the first side surface such that the secondary portion extends alongside the first side surface; and wherein the member of the first bracket has another necked region extending outwardly from the second side surface to another secondary portion, such that the another secondary portion extends alongside the second side surface.

6. The mounting assembly of claim 5 wherein the tab region, the secondary portion, and the another secondary portion extend longitudinally in a plane.

7. The mounting assembly of claim 1 wherein the necked region is sized with cross-sectional area to provide a predetermined stiffness; and wherein the secondary portion is sized with a predetermined mass; and wherein the secondary portion and the necked region form a tuned mass damper integrally formed with the first bracket and configured to damp an amplitude of a resonant frequency of the first bracket.

8. The mounting assembly of claim 1 wherein the secondary portion extends longitudinally from a first end to a second end; and wherein the necked region extends longitudinally along the secondary portion from the first end to the second end.

9. The mounting assembly of claim 1 wherein the tab region of the main portion has a first cross-sectional area, the secondary portion has a second cross-sectional area, and the necked region has a third cross-sectional area, the third cross-sectional area being less than the first and second cross-sectional areas.

10. The mounting assembly of claim 1 wherein the necked region extends outwardly from one of the first side surface, the second side surface, and the end surface to the secondary portion.

11. The mounting assembly of claim 1 wherein the second bracket is formed by a second member having a second main portion defining the third face and the fourth face, with another secondary portion extending outwardly from the main portion via another necked region.

12. The mounting assembly of claim 1 wherein the isolator mount element comprises one of a hydraulic fluid and a resilient material.

13. A mounting assembly comprising:

a first bracket with a main portion defining a first face to mate with a vehicle component, the main portion forming a tab defining a second face, a secondary portion extending outwardly from the tab via a necked region, wherein a cross-sectional area of the necked region is less than a cross-sectional area of the tab and less than a cross-sectional area of the secondary portion, and wherein the cross-sectional area of the tab is less than a cross-sectional area of the main portion a second bracket defining a third face to mate with a vehicle chassis and a fourth face; and an isolator mount element extending between and mating with the second and fourth faces.

14. The mounting assembly of claim 13 wherein the second face is planar; and wherein the necked region extends outwardly in a plane parallel to the second face.

15. A vehicle component mount active side bracket comprising:

a member having a main portion defining a first planar mounting face with a tab extending outwardly from the main portion to define a second planar mounting face, the member further defining a necked region extending outwardly from the tab and parallel to the second face to a secondary portion, wherein the tab, the necked region, and the secondary portion are co-planar in an unexcited state.

16. The active side bracket of claim 15 wherein a cross-sectional area of the necked region is less than a cross-sectional area of the tab and less than a cross-sectional area of the secondary portion, and wherein the cross-sectional area of the tab is less than a cross-sectional area of the main portion.

17. The active side bracket of claim 15 wherein the member further defines another necked region extending outwardly from the tab to another secondary portion, wherein the tab, the another necked region, and the another secondary portion are co-planar in an unexcited state and parallel to the second face.

* * * * *